US007634566B2

(12) United States Patent
Turner et al.

(10) Patent No.: US 7,634,566 B2
(45) Date of Patent: Dec. 15, 2009

(54) ARRANGEMENT IN A NETWORK FOR PASSING CONTROL OF DISTRIBUTED DATA BETWEEN NETWORK NODES FOR OPTIMIZED CLIENT ACCESS BASED ON LOCALITY

(75) Inventors: Bryan C. Turner, Apex, NC (US); John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 797 days.

(21) Appl. No.: 10/859,208

(22) Filed: Jun. 3, 2004

(65) Prior Publication Data

US 2005/0283649 A1 Dec. 22, 2005

(51) Int. Cl.
  G06F 15/16 (2006.01)
  G06F 17/30 (2006.01)
(52) U.S. Cl. .................. 709/226; 709/203; 709/201; 709/213; 709/217; 709/218; 709/219; 709/246; 707/8; 707/9; 707/10; 707/201; 707/E17.032
(58) Field of Classification Search ......... 709/217–219, 709/201, 203, 213, 226, 246; 707/8–10, 707/201, E17.032
See application file for complete search history.

(56) References Cited

U.S. PATENT DOCUMENTS

| 5,423,044 | A | * | 6/1995 | Sutton et al. ............... 710/200 |
| 5,442,797 | A | * | 8/1995 | Casavant et al. ............. 717/149 |
| 5,613,136 | A | * | 3/1997 | Casavant et al. ............... 712/28 |
| 5,737,738 | A | * | 4/1998 | Sharman ..................... 707/201 |
| 5,802,062 | A | | 9/1998 | Gehani et al. |
| 5,828,876 | A | * | 10/1998 | Fish et al. ..................... 707/1 |
| 5,829,025 | A | * | 10/1998 | Mittal ......................... 711/122 |
| 5,864,851 | A | * | 1/1999 | Breitbart et al. ................ 707/8 |
| 5,950,201 | A | * | 9/1999 | Van Huben et al. ........... 707/10 |
| 6,128,647 | A | * | 10/2000 | Haury ......................... 709/207 |

(Continued)

FOREIGN PATENT DOCUMENTS

EP 0814590 A2 12/1997

(Continued)

OTHER PUBLICATIONS

Ogasawara et al. TO-Lock: Removing Lock Overhead Using the Owner's Temporal Locality. IEEE Computer Society. 2004, abstract, sections 1 thru 4.2.*

(Continued)

*Primary Examiner*—Alina N. Boutah
(74) *Attorney, Agent, or Firm*—Leon R. Turkevich

(57) ABSTRACT

A network has network nodes for storage of respective copies of a data file. One of the network nodes has a corresponding unique locality control object for the copies of the data file. The locality control object provides authority for the one network node to control storing and modifying any of the copies of the data file. The other network nodes lacking the locality control object must obtain permission from the one network node before modifying any one of the copies of the data file. The network nodes also can negotiate for passing the locality control object from the one network node to another one of the network nodes based on determined locality attributes associated with the copies of the data file.

51 Claims, 6 Drawing Sheets

U.S. PATENT DOCUMENTS

| | | | |
|---|---|---|---|
| 6,421,767 B1 * | 7/2002 | Milillo et al. | 711/162 |
| 6,460,055 B1 * | 10/2002 | Midgley et al. | 707/204 |
| 6,516,350 B1 | 2/2003 | Lumelsky et al. | |
| 6,523,036 B1 | 2/2003 | Hickman et al. | |
| 6,523,066 B1 * | 2/2003 | Montroy et al. | 709/229 |
| 6,529,917 B1 | 3/2003 | Zoltan | |
| 6,532,535 B1 | 3/2003 | Maffezzoni et al. | |
| 6,539,381 B1 * | 3/2003 | Prasad et al. | 707/10 |
| 6,549,949 B1 | 4/2003 | Bowman-Amuah | |
| 6,550,057 B1 | 4/2003 | Bowman-Amuah | |
| 6,557,111 B1 | 4/2003 | Theimer et al. | |
| 6,560,609 B1 * | 5/2003 | Frey et al. | 707/103 R |
| 6,567,818 B1 | 5/2003 | Frey et al. | |
| 6,571,282 B1 | 5/2003 | Bowman-Amuah | |
| 6,574,617 B1 | 6/2003 | Immerman et al. | |
| 6,574,749 B1 * | 6/2003 | Parsons | 714/15 |
| 6,574,750 B1 | 6/2003 | Felber et al. | |
| 6,578,068 B1 | 6/2003 | Bowman-Amuah | |
| 6,578,069 B1 | 6/2003 | Hopmann et al. | |
| 6,611,631 B1 * | 8/2003 | Blair et al. | 382/296 |
| 6,678,719 B1 | 1/2004 | Stimmel | |
| 6,714,519 B2 | 3/2004 | Luzzatti et al. | |
| 6,779,025 B1 | 8/2004 | Wolfe et al. | |
| 6,826,570 B1 * | 11/2004 | Eshel et al. | 707/8 |
| 6,826,598 B1 * | 11/2004 | Titmuss et al. | 709/212 |
| 6,904,431 B2 * | 6/2005 | Holmgren | 707/8 |
| 7,080,075 B1 * | 7/2006 | Chan et al. | 707/8 |
| 7,299,285 B2 * | 11/2007 | Kasper, II | 709/226 |
| 7,328,263 B1 * | 2/2008 | Sadjadi | 709/225 |
| 7,340,743 B1 * | 3/2008 | Anural et al. | 718/104 |
| 2001/0039548 A1 | 11/2001 | Shinkai et al. | |
| 2001/0042139 A1 * | 11/2001 | Jeffords et al. | 709/316 |
| 2002/0177449 A1 * | 11/2002 | McDonnell et al. | 455/456 |
| 2003/0008661 A1 * | 1/2003 | Joyce et al. | 455/456 |
| 2003/0105871 A1 * | 6/2003 | Goldick | 709/229 |
| 2003/0131020 A1 * | 7/2003 | Karamanolis et al. | 707/200 |
| 2003/0233281 A1 * | 12/2003 | Takeuchi et al. | 705/26 |
| 2004/0199486 A1 * | 10/2004 | Gopinath et al. | 707/1 |
| 2004/0205339 A1 * | 10/2004 | Medin | 713/163 |
| 2005/0033948 A1 * | 2/2005 | Wei | 713/1 |
| 2005/0065961 A1 * | 3/2005 | Aguren | 707/102 |
| 2005/0120137 A1 * | 6/2005 | Moulton et al. | 709/244 |
| 2005/0226059 A1 * | 10/2005 | Kavuri et al. | 365/189.05 |
| 2005/0240748 A1 * | 10/2005 | Yoder | 711/170 |
| 2005/0283649 A1 * | 12/2005 | Turner et al. | 714/6 |
| 2006/0101025 A1 * | 5/2006 | Tichy et al. | 707/100 |

FOREIGN PATENT DOCUMENTS

| | | |
|---|---|---|
| EP | 1063831 A2 | 12/2000 |
| GB | 2385683 A | 8/2003 |

OTHER PUBLICATIONS

"Accessing Nearby Copies of Replicated Objects in a Distributed Environment", C. Greg Plaxton et al., ACM Symposium on Parallel Algorithms and Architectures, 1997.*

Dabek et al., "Building Peer-to-Peer Systems With Chord, a Distributed Lookup Service", Proceedings of the 8th Workshop on Hot Topics in Operating Systems (HotOS-VIII), May 2001.

Petersen at al., "Flexible Update Propagation for Weakly Consistent Replication", Proceedings of the 16th (ACM) Symposium on Operating Systems Principles (SSOP-16), Saint Malo, France, 1997.

Hildrum, "Why Do We Need Locality?", Feb. 17, 2004, http://oceanstore.cs.berkeley.edu/info/whytapestry.html.

Hildrum, "The Ocean Store Project", Feb. 17, 2004, http://oceanstore.cs.berkeley.edu/info/overview.html.

Wells, "The OceanStore Archive: Goals, Structures, and Self-Repair", U.C. Berkeley Masters Report, May 2000.

Search Report mailed Feb. 25, 2009, European Patent Application No. 05756076.5 (Corresponding to U.S. Appl. No. 10/859,208), 3 pages.

Sayal et al., "Selection Algorithms for Replicated Web Servers", Performance Evaluation Review ACM USA, vol. 26, No. 3, Dec. 1998, pp. 44-50, XP002515122.

Hara, "Effective Replica Allocation in Ad Hoc Networks for Improving Data Accessibility", Proceedings IEEE Infocom 2001. Conference on Computer Communications. Twentieth Annual Joint Conference of the IEEE Computer and Communications Society, IEEE Piscataway, NJ, vol. 3, 2001, pp. 1568-1576, XP002515123.

* cited by examiner

ARRANGEMENT IN A NETWORK FOR PASSING CONTROL OF DISTRIBUTED DATA BETWEEN NETWORK NODES FOR OPTIMIZED CLIENT ACCESS BASED ON LOCALITY

BACKGROUND OF THE INVENTION

1. Field of the Invention

The present invention relates to controlling storage, modification, and transfer of data in a network providing distributed data storage services.

2. Description of the Related Art

Data storage and retrieval technology requires the availability of data in a timely manner. Basic data storage techniques involve generating a copy of the original data as a backup: such backup systems include simultaneous copying to two or more storage locations (e.g., simultaneous copying to two hard drives), and archival of data. Data archival has progressed from tape backup systems, to backups using compact disc (CD-R) technology, etc.

Distributed storage systems typically maintain duplicate copies of data on multiple, distinct network nodes to ensure a loss of a network node does not cause a loss of data. In addition, the distributed storage systems enable multiple client devices access to the same data files throughout a network.

The presence of multiple duplicate copies of data throughout the network introduces a new problem in terms of data integrity, namely ensuring that any change to one of the data copies is a valid (i.e., authorized) change, and that any valid change is implemented in each of the copies to ensure consistency between the multiple copies.

In addition, a multi-client environment that enables multiple clients to access the same data files increases the level of complexity in terms of controlling write access to ensure changes by different clients can be merged into the data files. Although existing database technologies control modification of data files accessible by multiple users, such database technologies assume that the multiple users are accessing the same data file, as opposed to a duplicate copy elsewhere in the network.

This problem becomes readily apparent when considering a scenario where a network having multiple nodes for storage of respective copies of a data file is divided into two groups of nodes, for example due to a link failure between the groups or due to the first group of nodes moving together to another location inaccessible by the second group of nodes. In this case one of three options are available to provide data integrity: read only; write access statically assigned to only one of the groups, or synchronization when the two groups of nodes are rejoined into the original network.

The read only option obviously suffers from the disadvantage that the data cannot be modified by any node among the two groups of nodes. The static assignment of write access to only one of the groups requires manual selection and configuration, and still prevents the other group from any modification of the data. Synchronization between the two modified data files upon rejoining of the two groups requires a manual synchronization or source code management (e.g., version tracking). Further, a data merge problem may arise if both groups of nodes perform changes that are mutually exclusive.

Further, the relative importance of data files changes between entities over time: during initial creation, an author will need substantial write access to save the data file during its creation; following its creation, reviewers will prefer write access to review and edit the data file, while the author may require occasional write access to a lesser degree; following approval and publication, little or no write access is needed by the author or reviewers, resulting in the data file and its copies on the network needlessly using up storage space in the network.

An application which places data uniformly across all storage nodes will optimize data integrity, but cause worst-case performance in terms of client access. However, placing all data on one node close to the client optimizes data access but causes a worst-case scenario in terms of data integrity (loss of the one node results in data loss). Moving the data closer to a client (for example, in terms of hop count) is referred to herein as "locality".

An example of locality involves an e-mail client executed from a laptop computer, where the e-mail client is configured for accessing a pre-assigned e-mail server in a home office (e.g., Eastern United State); if the user travels to a distant office (e.g., in Western United States or Europe), and the e-mail client sends a request to a second e-mail server in the distant office, the second e-mail needs to retrieve the e-mail messages from the pre-assigned e-mail server in the home office for delivery to the e-mail client in the distant office. In this case, there is little locality between the e-mail messages and the e-mail client due to the necessity of the pre-assigned e-mail server being assigned as the destination repository for e-mail messages for the e-mail client.

SUMMARY OF THE INVENTION

There is a need for an arrangement that enables a data file to be copied and distributed among different network nodes in an efficient and secure manner, while optimizing access performance based on identifying a node best qualified to control writing to the data file.

There also is a need for arrangement that enables data to be stored and modified in a fault-tolerant matter.

There also is a need for an arrangement that provides distributed data storage in a network in a manner that provides automatic migration of both the distributed data, and write control to the distributed data, based on dynamic attributes detected within the network.

These and other needs are attained by the present invention, where a network has network nodes for storage of respective copies of a data file, one of the network nodes having corresponding unique locality control object for the copies of the data file. The locality control object provides authority for the one network node to control storing and modifying any of the copies of the data file. Any network node lacking the locality control object must obtain permission from the one network node before modifying any one of the copies of the data file. The network nodes also can negotiate for passing the locality control object from the one network node to another one of the network nodes based on determined locality attributes associated with the copies of the data file.

Hence, data distributed throughout a network can be controlled in an effective manner by a network node having possession of the locality control object. Moreover, since data storage can be independent from data control, the control of the distributed data can be passed based on determined locality attributes, ensuring that data control and data storage are optimized in the network as needed without concerns of complex data management schemes.

Moreover, the use of distributed service resources associated with the network nodes providing the copies of data enables deployment of distributed services, where a client device (e.g., an executable resource executed by a laptop computer) can provide the desired service to a user based on accessing a service node that is most appropriate for the user based on prescribed attributes (e.g., location of client device within the network, identity of the user, time of day, prescribed performance requirements, etc.).

One aspect of the present invention provides a method in a network node configured for connection to a network. The method includes identifying a data file for storage in the network, and selecting storage locations in the network for respective copies of the data file based on determined locality attributes relative to at least one user of the data file, based on the network node having possession of a unique locality control object for the data file. The selection of storage locations for the respective copies of the data file based on determined locality attributes enables the copies of the data file to be distributed at storage locations that provide optimized access for client network nodes that need to access a copy of the data file; hence, the copies of the data file can be concentrated in areas needed for optimized access by different client network nodes. Moreover, the selection of storage locations based on the network node having possession of a unique locality control object for the data file ensures that modifications to the distributed data file are controlled by a single node, preserving data integrity while providing distributed access.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
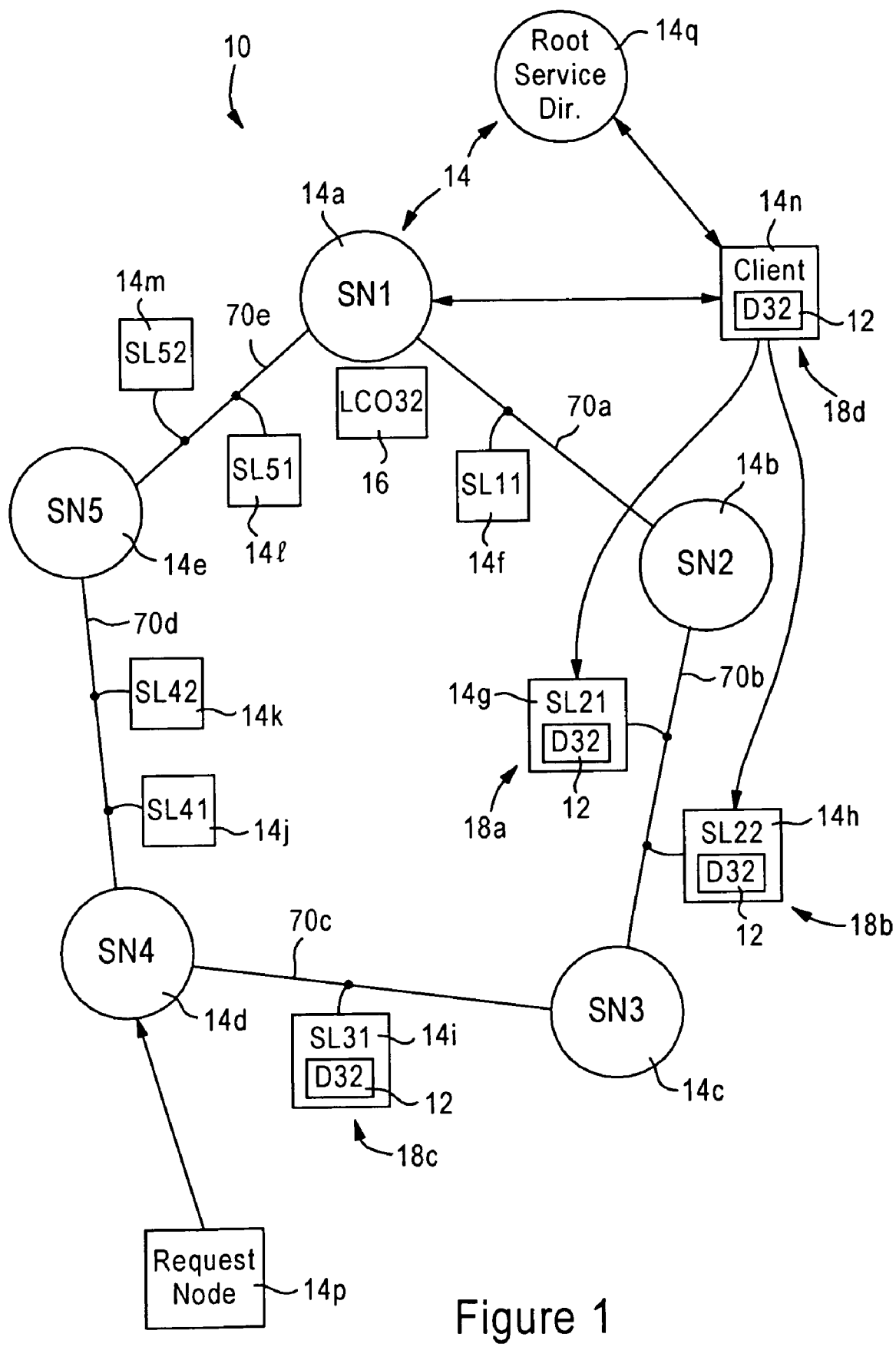
FIG. 1 is a diagram illustrating a network having nodes configured for distributed storage of a data file under control of a network node having possession of a locality control object for the data file, according to an embodiment of the present invention.

FIG. 1 is a diagram illustrating a network 10 configured for providing distributed services, for example distributed storage of a message 12, according to an embodiment of the present invention. The network 10 may be configured as a conventional Ethernet-based network, or may be configured as a mobile ad hoc network as described by the Mobile Ad-Hoc Networks (MANET) Working Group of the Internet Engineering Task Force.

The network 10 is composed of network nodes 14, for example client workstations such as laptop computers, stationery workstations, and the like. A particular feature of the disclosed embodiment is that the methods described herein do not necessarily rely on a client/server based protocol that requires a centralized server, but rather relies on providing distributed services among different network nodes 14 according to a peer-to-peer based model.

In addition, FIG. 1 illustrates a logical diagram overlying an existing network, for example an Internet Protocol based network. In particular, FIG. 1 illustrates different network nodes based on performing different functions. For example, the network nodes 14a, 14b, 14c, 14d, and 14e are illustrated to be configured as service nodes SN1, SN2, SN3, SN4, and SN5, respectively; the network nodes 14f, 14g, 14h, 14i, 14j, 14k, 14l, and 14m are illustrated to be configured as storage nodes SL11, SL21, SL22, SL31, SL41, SL42, SL51, and SL52, respectively, and the network node 14n is illustrated as being configured as a storage node as well as a client device. The network nodes 14p and 14q are illustrated as a request node and a root service directory, respectively. Additional details regarding operations in the network 10 are described below.

It should be noted that the functions described with respect to a given node can be combined, such that any given node can serve as a service node, a storage node, and/or a client or request node, as desired.

According to the disclosed embodiment, all copies of the data file 12 ("D32") are associated with a single, unique locality control object (LCO) 16 ("LCO32"). The unique locality control object 16 represents a control token for the corresponding set of copies of the data file 12. In particular, the network node having possession of the locality control object 16 ("LCO32") for the corresponding set of copies of the data file 12 ("D32"), also referred to herein as the "master service node", retains sole and exclusive authority in determining all write operations associated with the copies of the data file 12 ("D32"). Hence, none of the copies of the data file 12 ("D32"), illustrated as being stored in nodes 14g, 14h, 14i, and 14n, can be modified without approval by the network node 14 having possession of the corresponding locality control object 16 ("LCO32").

As described below, the master service node, illustrated in FIG. 1 as the network node 14a (SN1) retains authority to select the storage locations (e.g., 18a, 18b, 18c, 18d) in the network 10 for the respective copies of the data file 12. Further, the master service node (e.g., 14a) selects the storage locations (e.g., 18a, 18b, 18c, 18d) based on determined locality attributes relative to the users of the data file, for example the client 14n and the request node 14p.

In particular, the master service node (e.g., 14a) is able to select the storage locations based on locality attributes including the type of data, the performance attributes of candidate storage locations, and the type of requesting nodes that would need to access the data for both read only and read/write operations. Examples of locality attributes associated with the type of data include e-mail data, subscriber subscription information, video source data, and an authored document undergoing review prior to publication, etc. Examples of performance attributes includes frequency of access to the data file, the size of the data file, bandwidth or quality of service requirements (e.g., for video/audio streaming), as well as the associated performance metrics of the candidate storage location, including read/write throughput, file storage capacity, bandwidth availability, loading or CPU utilization at certain intervals such as a prescribed time of day, etc.

Hence, the master service node can select different storage locations 18 that are most appropriate for the entities (e.g., 14n, 14p) that need to access the data. Moreover, the disclosed embodiment recognizes that the necessity for storing data at a certain location may change over time, and that different client nodes or storage locations may be preferred depending on use and the relevance of the data at a particular point in time; at some point in time, the relative importance of the data may be reduced to merely requiring archived storage among distributed nodes. Consequently, the master service node can select different storage locations 18, and change those storage locations as the relative priorities of the storage locations change over time, as reflected by changes in the determined locality attributes relative to the user nodes requesting the data, the nodes storing the data, and the associations between the data, the users, the user nodes, etc.

Moreover, the disclosed embodiment contemplates that since different storage locations may be needed over time, a change in the service node best suited for controlling access to the data may occur based on changes in a locality attributes; hence, the disclosed embodiment enables the master service node (e.g., 14a) to identify another service node that is more appropriate for controlling the data 12, and transfer the unique locality control object 16 to the identified service node for transfer of control of the associated data.

For example, assuming a user of the client device 14n is initially authoring a document 12 and requesting storage thereof on the network 10 for purposes of backup at locations 18a and 18b and limited review by another node 14p at location 18c while the user continues to create the document 12 at the storage location 18d: the service node 14a may determine that the locality control object 16 should be passed to the client device 14n based on determining that the client device 14n is actively being used by the author of the document 12 to modify the document 12 stored at the location 18d. Upon receiving the corresponding locality control object 16, the client device 14n controls all modification requests for the data 12 at all locations 18a, 18b, 18c, and 18d based on possession of the corresponding locality control object 16.

Moreover, if the client device 14n is in possession of the locality control object 16 and becomes disconnected from the network 10 (e.g., in the case of a laptop computer), the client device 14n retains read/write control of the data file 12 stored at the location 18d, whereas the copies at the locations 18a, 18b and 18c are read only because the master service node (in this case the client node 14n) is not connected to the network 10. Upon reconnection to the network, the node 14n would update the data files 12 at the storage locations 18a, 18b and 18c to accurately reflect the copy of the data file 12 at the location 18d. As described below, a new locality control object 16 may be generated if the client node 14n in possession of the locality control object 16 remains disconnected from the network 10 beyond a maximum prescribed time interval (note that a longer prescribed time interval may be assigned to client nodes 14n that are regularly disconnected from the network 10 for travel).

Also note that transfer of control of the access to the data 12 may be implemented in hardware based on using a hardware device as the unique locality control object 16, for example a secure Universal Serial Bus (USB) key device (e.g., a secure key fob or dongle), where any computer having the USB key device installed becomes the master service node for the associated data 12. Alternately, the locality control object 16 can be generated by the service node (e.g., 14a) using a software based secure hash function.

Hence, depending on the application of the data 12 (e.g., e-mail application, word processing application, software code writing and review, etc.), the storage locations 18 of the data file 12 may change over time, and control may be passed from one node 14 to another in a manner that ensures that read/write access and control thereof is concentrated in the locality of the network most suitable for the maximum number of network nodes requesting read/write access to the data.

Figure 2:
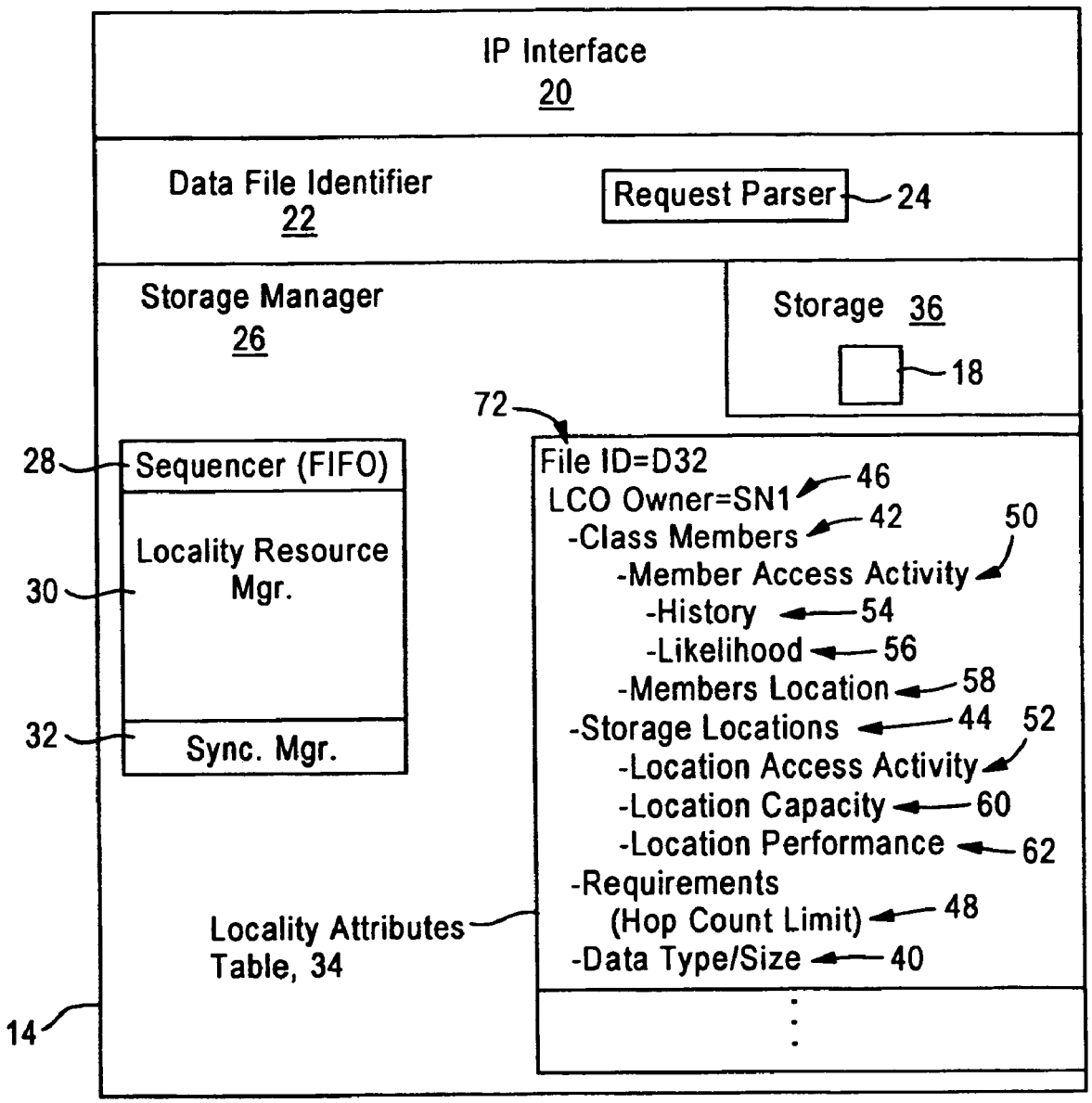
FIG. 2 is a diagram illustrating one of the network nodes of FIG. 1.

FIG. 2 is a diagram illustrating in detail one of the network nodes 14, according to an embodiment of the present invention. The network node 14 of FIG. 2 includes an IP interface 20, a data file identifier resource 22 that includes a request parser 24, and a storage manager 26. The IP interface 20, the data file identifier 22, and the storage manager 26 may be implemented as software-based executable resources, or alternately as a combination of software and hardware (e.g., programmable memory-based state machines). As apparent from the foregoing, each network node 14 also may include a data storage portion 36 for storing data files 12 at prescribed locations 18, although depending on network implementation the service nodes (e.g., SN1, SN2, SN3, SN4, and SN5) 14a, 14b, 14c, 14d, and 14e preferably would be configured for controlling storage of data on associated storage nodes 14f, 14g, 14h, 14i, 14j, 14k, 14l, and 14m.

The data file identifier 22 is configured for identifying a data file 12 for storage in the network 10. In particular, the request parser 24 is configured for receiving, from a requesting network node via the network 10 and the IP interface 20, a request to create or modify a data file stored in the network 10. In the case of a client node 14n, the request parser 24 first determines whether the request is from a local client application for storing a locally-stored data file onto the network 10, for example in the case of initial storage of the data file 12 onto the network 10; in this case, the request parser 24 may determine from the storage manager 26 whether the client node 14n is authorized to create a locality control object 16 and automatically select storage locations 18 in the network, or whether a locality control object 16 needs to be created within the network by the service node (e.g., 14a, 14b, 14c, 14d, and/or 14e). Such configuration settings may be set by a network administrator or the user of the client node 14n.

If the request parser 24 determines that its network node 14 is not in possession of the locality control object 16, and the data file identifier 22 does not know the location of the locality control object 16, the data file identifier 22 outputs via the IP interface 20 a service request to the root service directory 14q of FIG. 1. For example, assuming the client node 14n is traveling to a remote office and the user wishes to access his or her e-mail from the remote office, the client node 14n sends via the network 10 a service request to the root service directory 14q, which maintains a registry of all service nodes (e.g., 14a through 14e) distributed throughout the network and their associated locality, described below; the root service directory 14q sends back to the client node 14n the service response that redirects the client node 14n to a specified one of the service nodes 14a through 14e. The client node 14n then communicates with the service node as described below. Note that multiple root service directories 14q may be distributed throughout the network 10, as needed.

Referring to FIG. 2, the storage manager 26 of the network node 14 includes a sequencer FIFO (first-in first-out) buffer, a locality resource manager 30, a peer-to-peer sync manager 32, and a locality attributes table 34 including multiple file entries 72. The storage manager 26 is configured for selecting storage locations 18 in the network 10 for respective copies of the data file 12 based on determined locality attributes, specified in the locality attributes table 34, based on the storage manager 26 having possession of the corresponding locality control object 16 for the data file 12.

In particular, the IP interface 20 receives requests via the network 10; the request parser 24 parses the request, and in response to identifying the message as a request to modify an identified file for storage in the network, passes the request to the sequencer 28. The sequencer 28 operates as a FIFO buffer by ensuring that the requests are processed in the order received.

The locality resource manager 30 is configured for determining the optimum locality for a data file 12 relative to all relevant attributes associated with storage and retrieval of the data file, including: attributes of the data file including application type and size 40; attributes of the class members 42 accessing the data; and attributes 44 of the storage locations 18 and candidate storage locations that can be used for storing the data. Once the locality resource manager 30 has selected the storage locations 18 to be used for storing respective copies of the data file 12, the locality resource manager 30 outputs to the requesting node a grant to the request that either explicitly specifies the storage locations 18, or which includes a token that enables the requesting device to determine the storage locations accordingly. The sync manager 32 forwards a copy of the grant to the root service directory 14q and the remaining service nodes for distribution of the information associated with the data file 18, including storage locations 18 and the identity 46 of the owner of the corresponding locality control object 16.

As suggested above, the locality attributes table 34 includes the attributes relevant for the locality resource manager 30 to determine the best storage locations 18 in the network for the copies of the data file 12, and to determine the network node 14 best suited to have possession of the locality control object 16 as indicated by the owner identifier attribute 46 for the locality control object 16. For example, the locality resource manager 30 may selectively grant the request based on determining that the requesting network node (e.g., 14n, 14p) includes a prescribed locality attribute (e.g., IP address, user identifier, etc.) that has an established association with the locality control object 16 as represented by membership of the corresponding requesting network node or user in the identified membership class 42 (e.g., subscriber, engineer authorized to implement engineering changes, etc.). The locality resource manager 30 also may selectively grant the request based on determining that the distance (e.g., hop counts) between the requesting network node (e.g., 14n) and the storage location specified within the request (e.g., 18a) is within a prescribed hop count limit 48.

The locality attributes used by the locality resource manager 30 in selecting storage locations also may include activity attributes 50 and 52. For example, member access activity 50 may be evaluated to identify historical access activities 54, as well as likely activities 56 for members of the class. Note that the locality attributes table 34 may be implemented using relational data objects, enabling the attribute information to be shared across multiple data files. Hence, attributes such as class members 42, member class activity 50, member class activity history 54, member class activity likelihood 56, and member location 58 can be global (i.e., generic) for multiple data files 12, or may be specific on a per data file basis, as appropriate. However, the access activity attributes 50 typically will identify if specific members have substantially larger access requirements for the specific data file.

In the same manner, the locality attributes associated with the storage locations 44 may be global for multiple data files 12, or may be specific on a per data file basis, as appropriate, especially with respect to general performance metrics such as location capacity 60 (percent of total capacity in use) and location performance 62 (CPU utilization, bandwidth loading, etc.). However, the location access activity 52 typically will identify the specific locations (e.g., 18c) encountering substantially larger number of read/write access operations relative to other locations (e.g., 18a), indicating that a new storage location should be selected or that the locality control object 16 should be transferred.

Hence, the locality resource manager 30 monitors the attributes of data file being stored 12, the storage locations 18, and the network nodes (e.g., 14n, 14p) performing read/write access in order to determine the optimum storage locations (e.g., 18a, 18b, 18c, and 18d) during initial storage of the data file 12 in the network (i.e., "creation"). An example of the creation of the data file 12 in the network 10 is illustrated below with respect to FIG. 3.

The locality resource manager 30 also monitors the attributes of the data file 12, the storage locations 18, and the network nodes performing read/write access in order to determine whether a network node having submitted a request should be authorized to modify the data stored on the network. Note that any network node that does not receive authorization to modify the data still may perform read-only operations on the data, assuming the data is still at a specified location. An example of the selective grant to modify a specified data file 12 stored in the network 10 is illustrated below with respect to FIG. 4.

Finally, the locality resource manager is configured for monitoring the attributes of data file being stored 12, the storage locations 18, and the network nodes (e.g., 14n, 14p) performing read/write access in order to determine whether migration of the copies of the data file should be performed by changing storage locations 18, or whether migration of control should occur by passing the corresponding locality control object 16 to another network node 14. An example illustrating migration of the copies of the data file 12 and migration of control is illustrated below with respect to FIG. 5.

Figure 3:
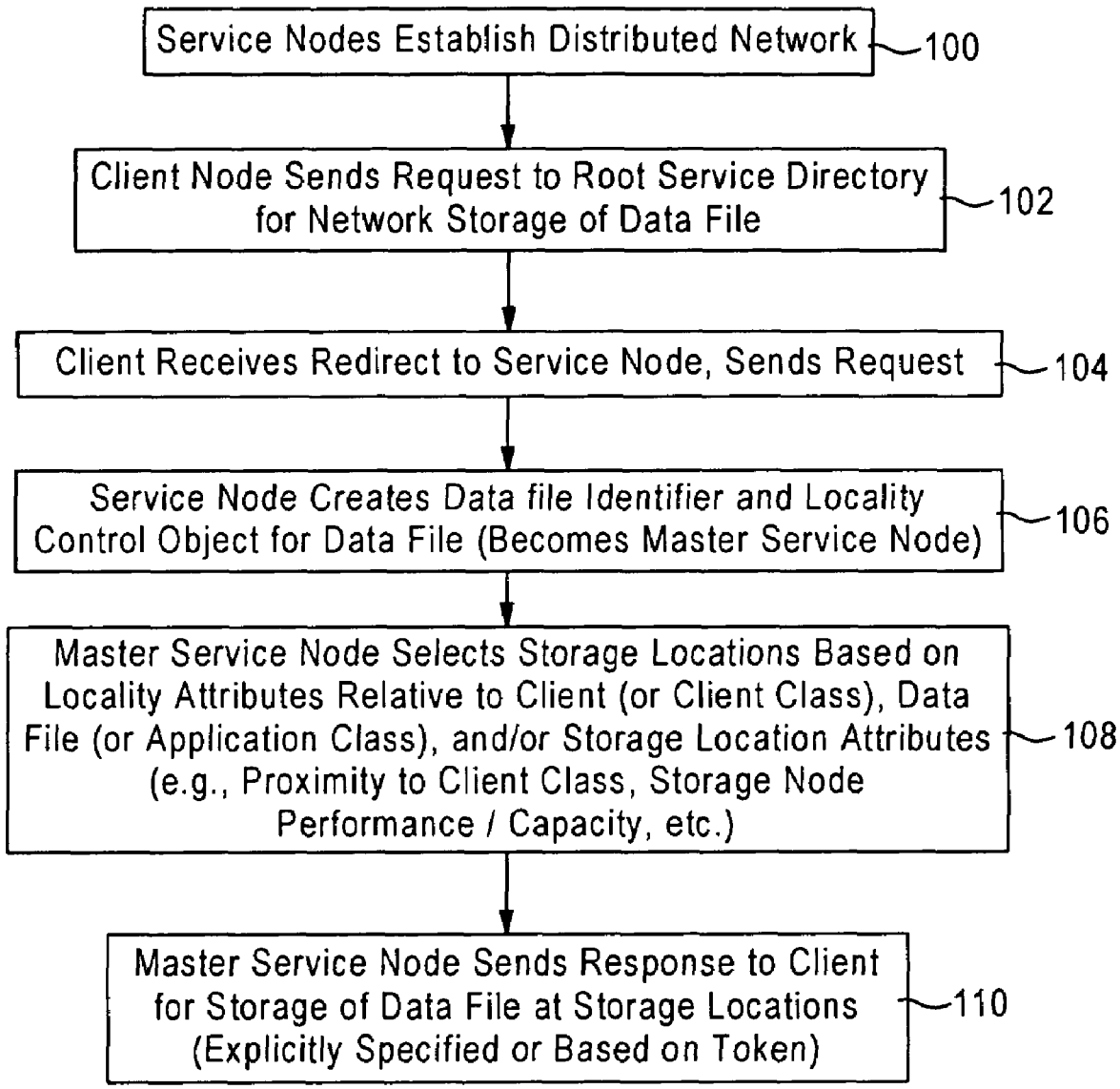
FIG. 3 is a diagram illustrating the method of storing in the network a data file by a network node having possession of a unique locality control object for the data file, according to an embodiment of the present invention.

FIG. 3 is a diagram illustrating the method of storing in the network a data file by a network node having possession of a unique locality control object for the data file, according to an embodiment of the present invention. The steps described herein with respect to FIGS. 3, 4, 5, and 6 can be implemented in each network node as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 100, where the service nodes (SN1, SN2, SN3, SN4, and SN5) 14a, 14b, 14c, 14d, and 14e establish the distributed network 10. For example, the IP interface 20 in each network node 14 on initialization selects a globally unique identifier (SNi), and sends an initial request to the root service directory 14*q* in an attempt to identify other network nodes 14 providing the distributed data storage service in the network 10. If during initialization the root service directory 14*q* indicates that no other network node is executing the distributed data storage service, the storage manager 26 in the network node having sent the initial request (e.g., 14*a*) self-initiates the distributed data storage service and registers the distributed data storage service with the root service directory 14*q*. Hence, the distributed data storage service is "self forming" based on the initial network node (e.g., 14*a*) self-initiating the service, and registering the service with the root service directory 14*q*, enabling subsequent network nodes (e.g., 14*b*, 14*c*, 14*d*, and 14*e*) to join in the service based on contacting the root service directory 14*q* as described above.

Further, the distributed data storage service is "self regulating" in that the storage manager 26 of each service node (SNi) assumes primary responsibility for storage of data in a prescribed storage region, enabling each service node to identify whether it is best suited for serving as a master service node as data is distributed throughout the network. For example, the service node 14*a* (SN1) may choose to assume responsibility for the storage node 14*f* (SL11) on segment 70*a* of the links between the service nodes; the service node 14*b* (SN2) may choose to assume responsibility for the storage nodes 14*g* (SL21) and 14*h* (SL22) on segment 70*b* of the links between the service nodes; the service node 14*c* (SN3) may choose to assume responsibility for the storage node 14*i* (SL31) on segment 70*c* of the links between the service nodes; the service node 14*d* (SN4) may choose to assume responsibility for the storage nodes 14*j* (SL41) and 14*k* (SL42) on segment 70*d* of the links between the service nodes; and the service node 14*e* (SN5) may choose to assume responsibility for the storage nodes 14*l* (SL51) and 14*m* (SL52) on segment 70*e* of the links between the service nodes.

Hence, as described below with respect to FIG. 5, the master service node (illustrated as SN1 14*a* in FIG. 1) may transfer ownership of the locality control object 16 to another node (e.g., 14*b*) based on determining that the copies of the data file are concentrated around the other identified node.

Referring again to FIG. 3, once the service nodes have established the distributed network 10, a client node 14*n* can send a request in step 102 to the root service directory 14*q* to request network storage of the data file 12. For example, the request may be in the form of a user requesting the service ("user.storage.xyz.com"); the root service directory 14*q*, which serves as a root service directory for the distributed service "storage.xyz.com", determines the most appropriate service node (e.g., 14*a*) for the user-specific service "user.storage.xyz.com" to be provided to the user based on the internal directory information established in step 100, user identifier, network address, etc., and sends a redirect command to the client device 14*n*.

The client device 14*n* receives in step 104 the redirect command to send the request to the appropriate service node (e.g., 14*a*), and in response sends the service request for storage of the data file (e.g., "store data for user.storage.xyz.com").

The request parser 24 of the service node 14*a* parses the request and forwards the request to the storage manager 26. The storage manager 26 of the service node 14*a* creates in step 106 a new entry 72 in the locality attributes table 34 that specifies a data file identifier ("D32"), and an owner 46 for a new locality control object ("LCO32") 16 created by the storage manager 26 for the data file. Hence, the service node 14*a* becomes the master service node based on possession of the locality control object 16. The locality resource manager 30 of the master service node 14*a* selects in step 108 the storage locations 18*a*, 18*b*, and 18*c* based on the locality attributes relative to the client (e.g., attributes 42, 50, 54, 56, 58), the locality attributes 40 relative to the data file 12 (including application class such as e-mail, video, audio, archive, word processing file, etc.) and storage location attributes (e.g., attributes 44, 52, 60, 62) including proximity of the requesting node to the client class as a whole, storage node performance in capacity, etc.

The master service node 14*a* sends in step 110 a response to the client device 14*n* for storage of the data file 12 at the selected storage locations 18*a*, 18*b*, 18*c*, and 18*d*. The response to the client device 14*n* may explicitly specify the storage locations (e.g., "Store D32 at SL21, SL22, SL31, Client Device"), or may specify a token (e.g., "D32.user.storage.xyz.com") to be used by the client device 14*n* for deriving the storage locations. In response the client device 14*n* stores the data file 12 at the storage locations selected by the master service node 14*a*.

Figure 4:
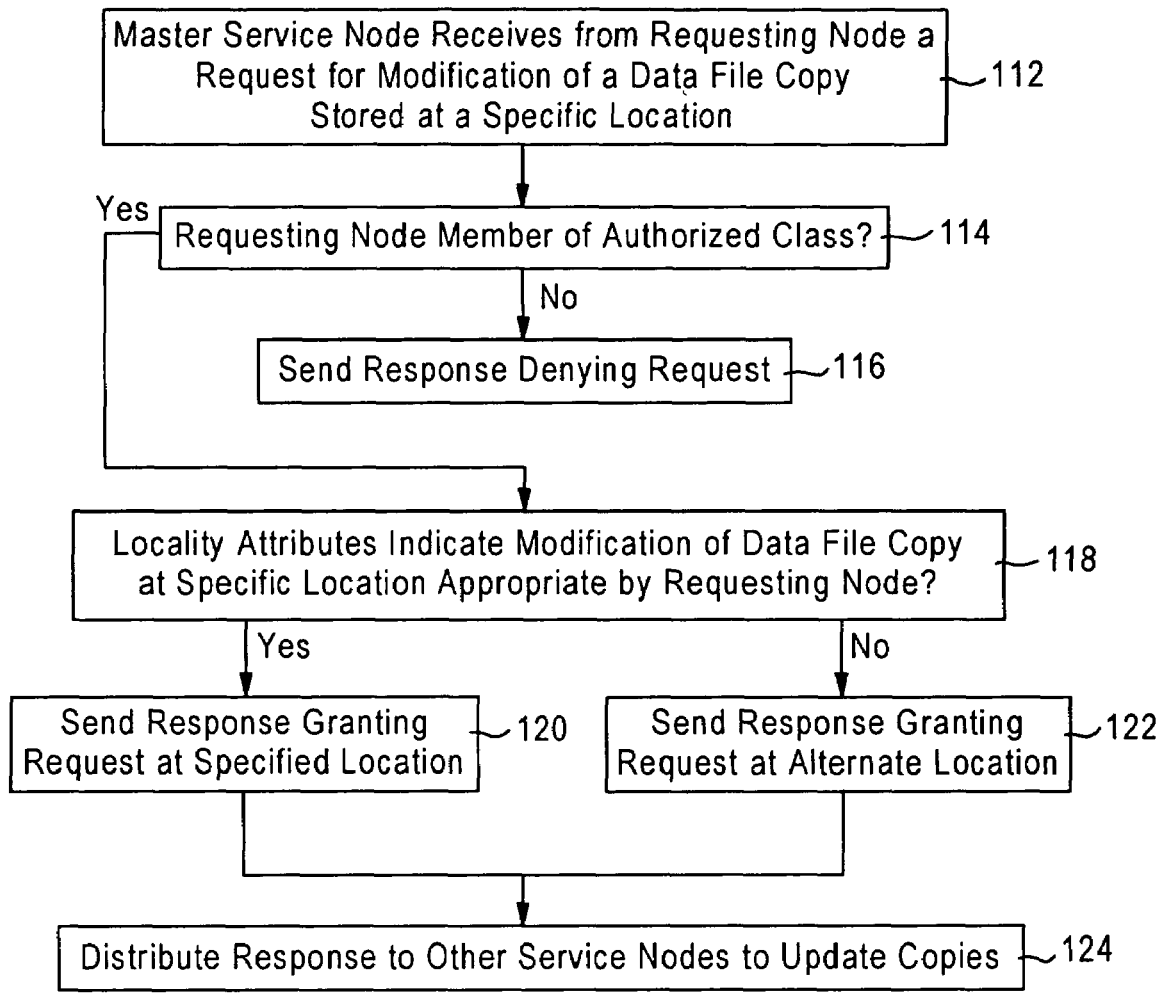
FIG. 4 is a diagram illustrating the method by the network node having possession of the unique locality control object of selectively granting a request to modify the data file stored in the network, according to an embodiment of the present invention.

FIG. 4 is a diagram illustrating the method by the master service node (e.g., 14*a*) having possession of the unique locality control object 16 of selectively granting a request to modify the data file 12 stored in the network 10, according to an embodiment of the present invention. The data file identifier 22 of the master service node 14*a* receives in step 112 a request from a requesting node (e.g., 14*p*) for modification of a copy of the data file 32 stored at the specific location 18*c*. Note that the intermediate service nodes 14*d*, 14*e* may forward the request from the requesting node 14*p* to the master service node 14*a* having possession of the locality control object 16 ("LCO32") for the corresponding data file 12 ("D32").

The locality resource manager 30 determines in step 114 whether the requesting node 14*p* is a member of the authorized class 42 specified in the entry 72 of the locality attributes table 34. If the requesting node 14*p* is not a member of the class, the storage manager 26 of the master service node 14*a* outputs in step 116 a response denying the request. Note however, that the requesting node 14*p* still may have permission to access the data file 12 on a read-only basis.

Assuming in step 114 that the requesting node is a member of the authorized class, the locality resource manager 30 determines in step 118 whether the locality attributes in the entry 72 indicate it is appropriate for the requesting node 14*p* to modify the data file at the specified location (e.g., 18*c*).

If modification at the specified location (e.g., 18*c*) is appropriate, the locality resource manager 30 outputs in step 120 a response granting the request at the specified location; however if in step 118 the locality resource manager 30 determines that modification at the specified location would be inappropriate, for example if the request node 14*p* requested to modify the copy stored at the location 18*a* in the network node 14*g*, the locality resource manager 30 sends a response in step 122 granting the request to modify, but at an alternate location (e.g., 18*c*) that is closer to the request node 14*p*. The synchronization manager 32 distributes the response in step 124 to the other service nodes to ensure that the modification performed by the request node 14*p* is implemented within the remaining copies of the data file 12.

Hence, the locality resource manager 30 of the master service node ensures that any requesting node connected to the network 10 modifies the closest data file for optimum performance. As described below, the locality resource manager 30 also may determine that the storage locations (e.g., 18*a*, 18*b*, and/or 18*c*) should be moved based on migration of users to different locations, a change in the users that are accessing the data (e.g., engineering team is no longer accessing the data, but sales teams need the data at sales offices), or a change in the relative importance of the data from active use, to occasional use, to archival storage. In addition, the locality resource manager 30 may decide to transfer control of the data file to another network node by transferring the corresponding locality control object 16.

Figure 5:
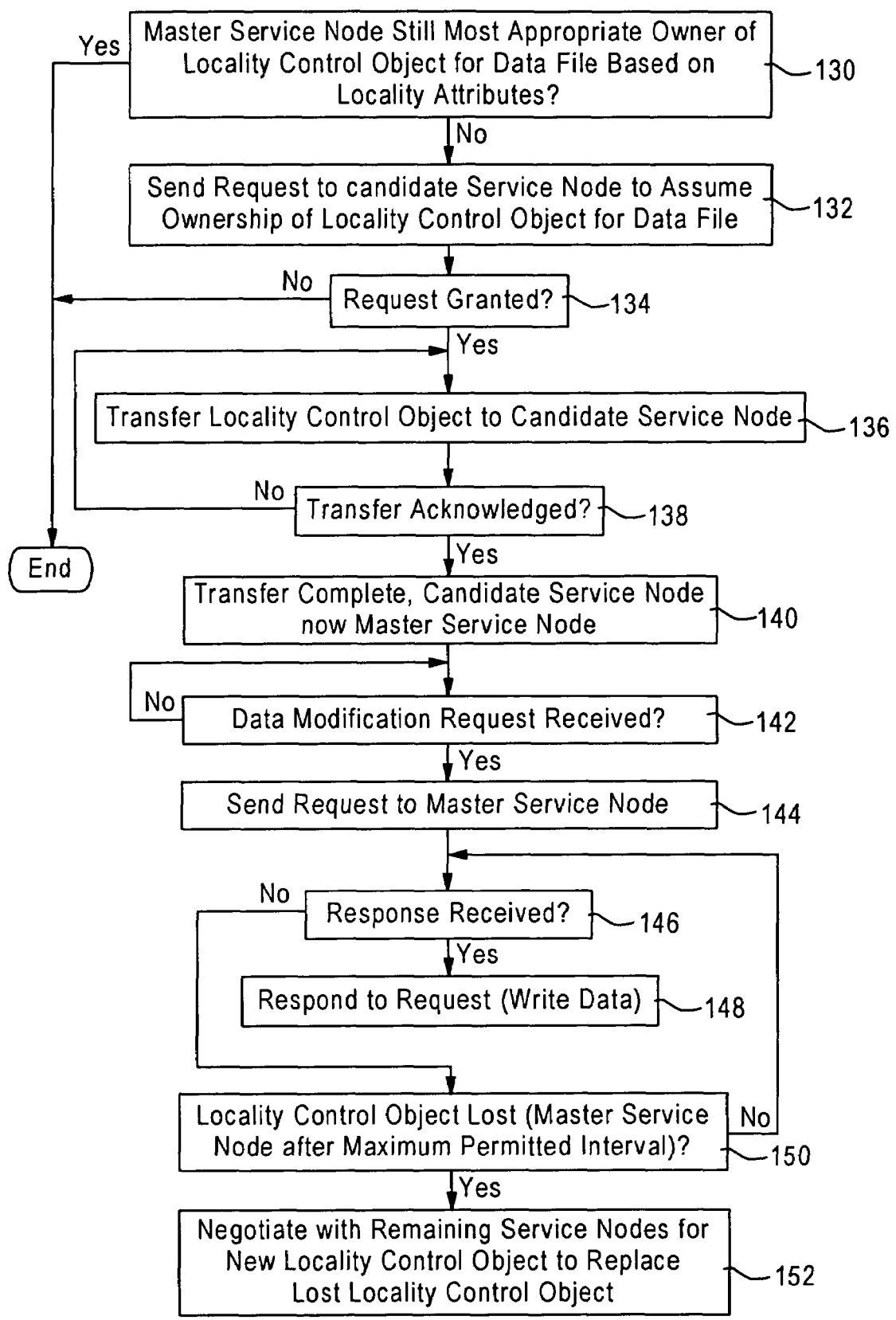
FIG. 5 is a diagram illustrating a method by the network node having possession of the unique locality control object of transferring control of the unique locality control object to another network node based on locality attributes, and illustrating operations performed without possession of the unique locality control object, according to an embodiment of the present invention.

FIG. 5 is a diagram illustrating a method by the network node 14 having possession of the unique locality control object 16 of transferring control of the unique locality control object 16 to another network node based on locality attributes, and illustrating operations performed without possession of the unique locality control object, according to an embodiment of the present invention.

The locality resource manager 30 in the master service node (e.g., 14a) determines in step 130 whether it is still the most appropriate owner of the locality control object 16 ("LCO32") for the corresponding data file 12 ("D32") based on the locality attributes in the attributes table entry 72. For example, as illustrated in FIG. 1 the locality resource manager 30 of the master service node 14a determines that most of the storage locations 18a, 18b, and 18c are at the remote nodes 14g, 14h, and 14i, and assume that the client node 14n attaches to the segment 70c; in this case, the locality resource manager 30 of the master service node 14a sends in step 132 the request to the candidate service node 14c (SN3) to assume ownership of the locality control object 16 for the corresponding data file 12. If in step 134 the request is granted by the candidate service node 14c, the service node 14a (SN1) transfers ownership of the data file 12 by transferring in step 136 the locality control object 16 to the candidate service node 14c.

In response to the service node 14c acknowledging transfer in step 138, the locality resource manager 30 of the service node 14a updates in step 140 the ownership identifier 46 in the table entry 72 to specify that the candidate service node 14c is the new master service node. The sync managers 32 of the old master service node 14a and the new master service node 14c cooperate to ensure the remaining service nodes and the root service directory 14q are updated to identify the new owner of the locality control object 16.

Consequently, if in step 142 the old master service node 14a receives a data modification request, the service node 14 forwards the request in step 144 to the new master service node 14c. Hence, if approval is received in step 146 by the old master service node 14a from the new master service node 14c, the service node 14a forwards the response in step 148 to the network node having sent the request.

Instances may arise where the locality control object 16 may be lost, due to a failure by the master network node having possession of the locality control object. For example, the service nodes 14 may be able to determine based on prescribed network management systems that the master service node (e.g., 14c) is unavailable, for example if no activity is detected from the master service node 14c for a prescribed time interval (e.g., five minutes). In the case where the locality control object is controlled by a mobile node 14n such as laptop, a greater time interval may be permitted to accommodate for time intervals where the user may be traveling.

If in step 150 a service node 14 (e.g., 14d) determines that the locality control object 16 is lost, the storage manager 26 of the service nodes 14 may negotiate with the remaining service nodes for a new locality control object to replace the lost locality control object in step 152. In this case, the owner identity 46 of the new locality control object is updated in the table entry 72, removing from service the lost locality control object. In the event that the network node (e.g., 14c) having the lost locality control object re-establishes a connection to the network 10, that network node would need to renegotiate with the other service nodes for possession of the new locality control object 16.

Figure 6:
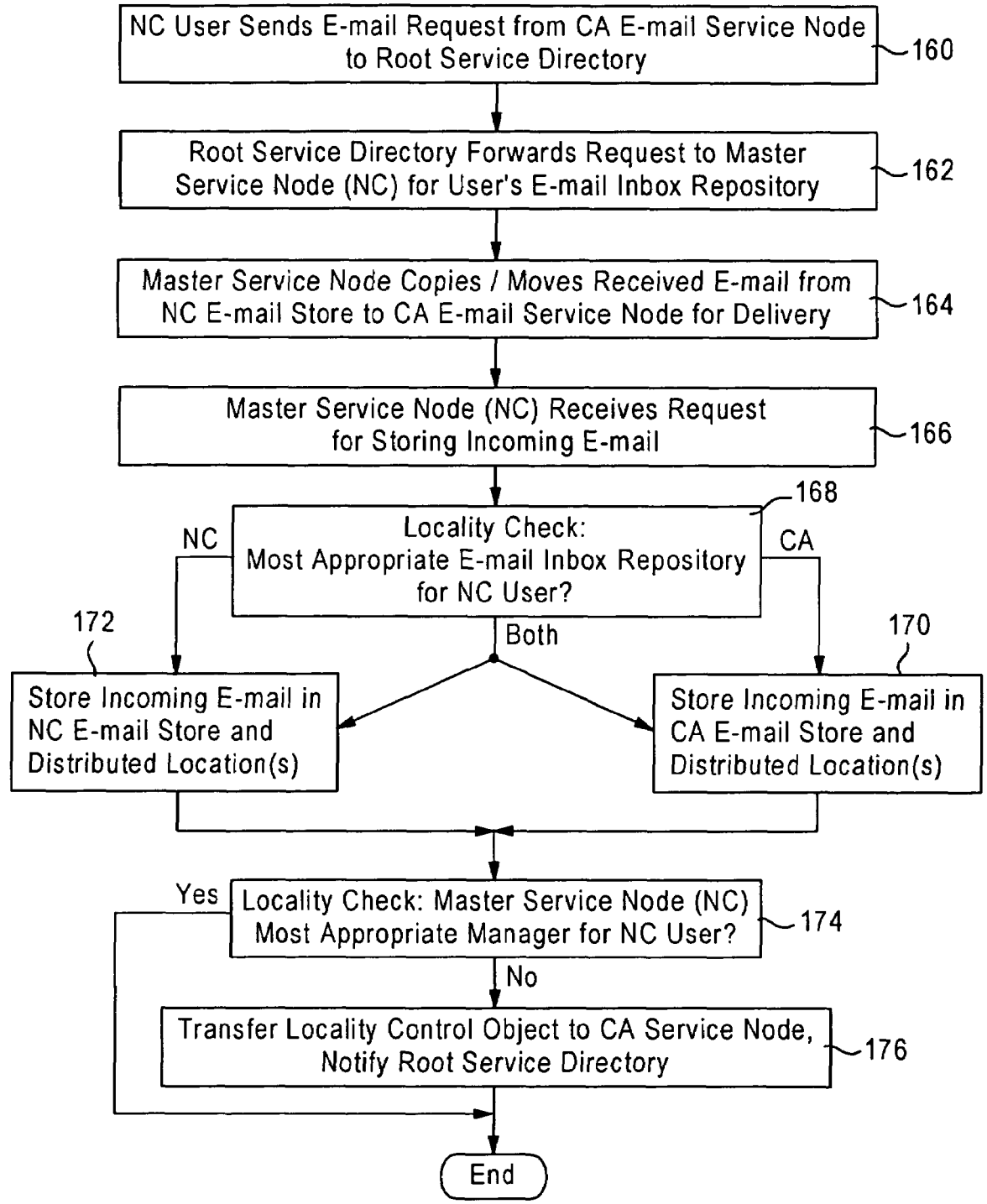
FIG. 6 is a diagram illustrating implementation of the above-described methods for locality-based transfer of e-mail messages to an e-mail client, according to an embodiment of the present invention.

As described above, the disclosed embodiment is particularly effective in storing copies of a data file at locations that are most suitable for the users requiring access, and migrating the storage locations and control as necessary based on user activity. The disclosed embodiment is particularly effective for mobile users, as illustrated in the following example regarding e-mail applications FIG. 6 is a diagram illustrating implementation of the above-described methods for locality-based transfer of e-mail messages to an e-mail client, according to an embodiment of the present invention. Assume in this example that the client device 14n includes an e-mail client for a user resident in an office in North Carolina and that accesses the service node 14a in the North Carolina office as its current service node: the service node 14a has possession of the locality control object 16 associated with the user's e-mail service "user.mail.xyz.com", and typically stores the user's e-mail inbox repository in the storage node 14f ("SL11") plus at least one other backup storage node (not shown).

Assume in step 160 that the North Carolina (NC) user travels to another company office in California (CA), and accesses the e-mail service "user.mail.xyz.com" via the requesting node 14p. Since the local service node 14d is not aware of the e-mail service "user.mail.xyz.com" for the visiting user, the e-mail request is sent to the root service directory 14q in step 160. The root service directory 14q forwards the request in step 162 to the master service node 14a requesting transfer of the user's e-mail inbox repository to the destination node 14p.

The request parser 24 of the master service node 14a passes the request to the storage manager 26, which copies or moves the received e-mail from the local e-mail store 14f to the CA e-mail service node 14d for delivery in step 164. Alternately, the master service node 14a may provide the location address to the requesting service node 14d, enabling the requesting service node 14d to retrieve the mail messages from the NC e-mail store 14f.

Assume now that the master service node 14a receives in step 166 a request for storing incoming e-mail destined for the user of the service "user.mail.xyz.com". The locality resource manager 30 in the master service node 14a performs a locality check in step 168 to determine whether the local NC e-mail store 14f is the most appropriate e-mail inbox repository for the user of the service "user.mail.xyz.com" based on the recent access activity from the CA service node 14d.

If the locality resource manager 30 determines in step 168 that the existing NC e-mail store 14f is no longer the most appropriate repository for the user of the service "user.mail.xyz.com" (e.g., due to a week-long business trip), the locality resource manager 30 selects in step 170 storage of incoming e-mail to include the CA e-mail store 14i; alternately, if the locality resource manager 30 of the master service node 14a determines that incoming e-mail still should be stored in the NC e-mail store 14f, the locality resource manager 30 may select to store in step 172 the incoming e-mail in the NC e-mail store 14f. Also note that the locality resource manager 30 may choose to store the incoming mail in both message stores 14f and 14i given the transient nature of the user of the service "user.mail.xyz.com".

The locality resource manager 30 also will determine in step 174 whether the master service node 14a is the most appropriate manager for the user of the service "user.mail.x- yz.com", for example in the event that the user of the service is located in the California office for an extended interval. If in step 174 the master service node 14a determines that the CA service node 14d would be the most appropriate manager for the user of the service "user.mail.xyz.com", the master service node 14a transfers in step 176 the locality control object 16, as described above with respect to FIG. 5 enabling control of the data to the move closer to the location of the user accessing the data.

According to the disclosed embodiment, distributed data storage services are optimized by selecting storage locations that are closest to the client devices accessing the data. Moreover, the disclosed arrangement enables the storage locations to migrate based on detected changes in activity in accessing the data, enabling data (e.g., e-mail messages) to be pre-cached to a user's local node even before the user has request of the data. Finally, centralized control of the distribute data is managed by a network node having possession of a locality control object based on locality attributes; hence, the location of control may change to ensure that control is closest to the largest concentration of users accessing the data.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node configured for connection to a network, the method including:
    the network node identifying a data file for storage in the network; and
    the network node selecting storage locations among available network nodes in the network for respective copies of the data file based on determined locality attributes relative to at least one user of the data file, the network node selecting the storage locations based on the network node having possession of a unique locality control object for the data file, the locality control object providing sole and exclusive authority for controlling storage or modifying of any of the copies by the network node or any of the available network nodes, each storage location selected by the network node being within a corresponding selected one of the available network nodes, identifiable as a storage node, the storage nodes storing the respective copies being less in number than the available network nodes, wherein the locality control object is transferrable to another network node among the available network nodes.

2. The method of claim 1, further comprising:
    the network node receiving, from a requesting network node among the available network nodes via the network, a request to modify the data file; and
    the network node selectively granting the request to modify the data file to the requesting network node, based on determining the requesting network node has a prescribed locality attribute having an established association with the locality control object.

3. The method of claim 2, wherein:
    the receiving includes detecting that the request specifies modification of one of the copies of the data file stored at a corresponding specified storage location;
    the selectively granting includes selectively granting the request based on the prescribed locality attribute indicating a distance attribute within a required distance attribute between the specified storage location and the requesting network node.

4. The method of claim 3, wherein the established association identifies the user having generated the request at the requesting network node to be a member of a class associated with the locality control object.

5. The method of claim 3, wherein the distance attribute is based on a determined number of hop counts between the requesting network node and the corresponding storage location of the one of the copies of the data file.

6. The method of claim 2, wherein the selectively granting includes distributing the grant of the request among respective network nodes among the available network nodes and that are configured for controlling the respective storage locations, for implementing the request among the respective copies of the data file.

7. The method of claim 1, wherein the selecting includes:
    determining an access activity attribute for the data file, the access activity attribute indicating an identified user class, having a prescribed association with a determined attribute of the data file, that has at least one of a prescribed likelihood of accessing the data file or a determined history of accessing the data file, the identified user class including the at least one user;
    selecting the storage locations based on determined locality attributes relative to the identified user class.

8. The method of claim 7, wherein the selecting further includes selecting at least one new storage location in the network, for one of an existing copy of the data file or a new copy of the data file, based on detecting a change in the access activity attribute.

9. The method of claim 8, wherein the data file is an e-mail message, the selecting at least one new storage location including selecting a new delivery location for the e-mail message based on the access activity attribute indicating the at least one user is closer to the new delivery location relative to previously-selected storage locations of prior e-mail messages for the at least one user.

10. The method of claim 9, wherein the selecting of a new delivery location for the e-mail message includes sending the at least one of the existing copy or a new copy of the e-mail message to the new delivery location prior to receiving an e-mail update request for the e-mail message from the at least one user.

11. The method of claim 8, wherein the step of selecting the storage locations based on determined locality attributes relative to the identified user class includes selecting the storage locations based on the storage locations being within a prescribed proximity to members of the identified user class.

12. The method of claim 11, wherein selecting includes selecting each storage location based on the storage location meeting a prescribed minimum performance requirement.

13. The method of claim 8, wherein the selecting further includes selecting the new storage location based on a detected loss of performance in the storage location storing the existing copy of the data file.

14. The method of claim 8, further comprising:
    the network node identifying the another network node, based on the access activity attribute, that has a determined proximity that is closer to the identified user class than the network node;
    the network node transferring the unique locality control object to the another network node, for control of the copies of the data file by the another network node, based on the another network node having the determined proximity closer to the identified user class than the network node.

15. The method of claim 14, further comprising:
the network node sending a new request to the another network node for modification of one of the copies of the data file, based on the another network node having possession of the unique locality control object; and
the network node selectively modifying the one copy of the data file based on whether the another network node approves the new request.

16. The method of claim 14, further comprising:
the network node determining that the unique locality control object for the data file is no longer available on the network based on a determined absence for a prescribed interval; and
the network node generating within the network a new unique locality control object for the data file to replace the unique locality control object having been determined as no longer available.

17. The method of claim 1, further comprising:
the network node identifying the another network node that has a corresponding determined proximity, closer than the network node, to access activity identified from the determined locality attributes; and
the network node transferring the unique locality control object to the another network node, for control of the copies of the data file by the another network node, based on the another network node having the determined proximity closer to the identified access activity than the network node.

18. A network node configured for connection to a network, the network node including:
means for identifying a data file for storage in the network; and
means for selecting storage locations among available network nodes in the network for respective copies of the data file based on determined locality attributes relative to at least one user of the data file, the means for selecting configured for selecting the storage locations based on the network node having possession of a unique locality control object for the data file, the locality control object providing sole and exclusive authority for controlling storage or modifying of any of the copies by the network node or any of the available network nodes, each storage location selected by the means for selecting being within a corresponding selected one of the available network nodes, identifiable as a storage node, the storage nodes storing the respective copies being less in number than the available network nodes, wherein the locality control object is transferrable to another network node among the available network nodes.

19. The network node of claim 18, wherein:
the means for identifying is configured for receiving, from a requesting network node among the available network nodes via the network, a request to modify the data file; and
the means for selecting is configured for selectively granting the request to modify the data file to the requesting network node, based on determining the requesting network node has a prescribed locality attribute having an established association with the locality control object.

20. The network node of claim 19, wherein:
the means for identifying is configured for detecting that the request specifies modification of one of the copies of the data file stored at a corresponding specified storage location;
the means for selecting is configured for selectively granting the request based on the prescribed locality attribute indicating a distance attribute within a required distance attribute between the specified storage location and the requesting network node.

21. The network node of claim 20, wherein the established association identifies the user having generated the request at the requesting network node to be a member of a class associated with the locality control object.

22. The network node of claim 20, wherein the distance attribute is based on a determined number of hop counts between the requesting network node and the corresponding storage location of the one of the copies of the data file.

23. The network node of claim 19, wherein the means for selecting is configured for distributing the grant of the request among respective network nodes among the available network nodes and that are configured for controlling the respective storage locations, for implementing the request among the respective copies of the data file.

24. The network node of claim 18, wherein the means for selecting is configured for:
determining an access activity attribute for the data file, the access activity attribute indicating an identified user class, having a prescribed association with a determined attribute of the data file, that has at least one of a prescribed likelihood of accessing the data file or a determined history of accessing the data file, the identified user class including the at least one user; and
selecting the storage locations based on determined locality attributes relative to the identified user class.

25. The network node of claim 24, wherein the means for selecting is configured for selecting at least one new storage location in the network, for one of an existing copy of the data file and a new copy of the data file, based on detecting a change in the access activity attribute.

26. The network node of claim 25, wherein the data file is an e-mail message, the means for selecting configured for selecting, as the at least one new storage location, a new delivery location for the e-mail message based on the access activity attribute indicating the at least one user is closer to the new delivery location relative to previously-selected storage locations of prior e-mail messages for the at least one user.

27. The network node of claim 26, wherein the means for selecting is configured for sending the at least one of the existing copy or a new copy of the e-mail message to the new delivery location prior to receiving an e-mail update request for the e-mail message from the at least one user.

28. The network node of claim 25, wherein the selecting means is configured for selecting the storage locations based on the storage locations being within a prescribed proximity to members of the identified user class.

29. The network node of claim 28, wherein selecting means is configured for selecting each storage location based on the storage location meeting a prescribed minimum performance requirement.

30. The network node of claim 25, wherein the selecting means is configured for selecting the new storage location based on a detected loss of performance in the storage location storing the existing copy of the data file.

31. The network node of claim 25, wherein the means for selecting is configured for:
identifying the another network node, based on the access activity attribute, that has a determined proximity that is closer to the identified user class than the network node; and
transferring the unique locality control object to the another network node, for control of the copies of the data file by the another network node, based on the another network node having the determined proximity closer to the identified user class than the network node.

32. The network node of claim 31, further comprising:
means for sending a new request to the another network node for modification of one of the copies of the data file, based on the another network node having possession of the unique locality control object; and
means for selectively modifying the one copy of the data file based on whether the another network node approves the new request.

33. The network node of claim 31, wherein:
the means for identifying is configured for determining that the unique locality control object for the data file is no longer available on the network based on a determined absence for a prescribed interval; and
the means for selecting is configured for generating within the network a new unique locality control object for the data file to replace the unique locality control object having been determined as no longer available.

34. The network node of claim 18, wherein the means for selecting is configured for:
identifying the another network node that has a corresponding determined proximity, closer than the network node, to access activity identified from the determined locality attributes; and
transferring the unique locality control object to the another network node, for control of the copies of the data file by the another network node, based on the another network node having the determined proximity closer to the identified access activity than the network node.

35. A network node configured for connection to a network, the network node including:
a data file identifier configured for identifying a data file for storage in the network; and
a storage manager configured for selecting storage locations among available network nodes in the network for respective copies of the data file based on determined locality attributes relative to at least one user of the data file, the storage manager configured for selecting the storage locations based on the network node having possession of a unique locality control object for the data file, the locality control object providing sole and exclusive authority for controlling storage or modifying of any of the copies by the network node or any of the available network nodes, each storage location selected by the storage manager being located within a corresponding selected one of the available network nodes, identifiable as a storage node, the storage nodes storing the respective copies being less in number than the available network nodes, wherein the locality control object is transferrable to another network node among the available network nodes.

36. The network node of claim 35, wherein:
the data file identifier is configured for receiving, from a requesting network node among the available network nodes via the network, a request to modify the data file; and
the storage manager is configured for selectively granting the request to modify the data file to the requesting network node, based on determining the requesting network node has a prescribed locality attribute having an established association with the locality control object.

37. The network node of claim 36, wherein:
the network node is configured for detecting that the request specifies modification of one of the copies of the data file stored at a corresponding specified storage location;
the storage manager is configured for selectively granting the request based on the prescribed locality attribute indicating a distance attribute within a required distance attribute between the specified storage location and the requesting network node.

38. The network node of claim 37, wherein the established association identifies the user having generated the request at the requesting network node to be a member of a class associated with the locality control object.

39. The network node of claim 37, wherein the distance attribute is based on a determined number of hop counts between the requesting network node and the corresponding storage location of the one of the copies of the data file.

40. The network node of claim 36, wherein the storage manager is configured for distributing the grant of the request among respective network nodes among the available network nodes and that are configured for controlling the respective storage locations, for implementing the request among the respective copies of the data file.

41. The network node of claim 35, wherein storage manager is configured for:
identifying the another network node that has a corresponding determined proximity, closer than the network node, to access activity identified from the determined locality attributes; and
transferring the unique locality control object to the another network node, for control of the copies of the data file by the another network node, based on the another network node having the determined proximity closer to the identified access activity than the network node.

42. The network node of claim 35, wherein the storage manager is configured for:
determining an access activity attribute for the data file, the access activity attribute indicating an identified user class, having a prescribed association with a determined attribute of the data file, that has at least one of a prescribed likelihood of accessing the data file or a determined history of accessing the data file, the identified user class including the at least one user; and
selecting the storage locations based on determined locality attributes relative to the identified user class.

43. The network node of claim 42, wherein the storage manager is configured for selecting at least one new storage location in the network, for one of an existing copy of the data file or a new copy of the data file, based on detecting a change in the access activity attribute.

44. The network node of claim 43, wherein the data file is an e-mail message, the storage manager configured for selecting, as the at least one new storage location, a new delivery location for the e-mail message based on the access activity attribute indicating the at least one user is closer to the new delivery location relative to previously-selected storage locations of prior e-mail messages for the at least one user.

45. The network node of claim 44, wherein the storage manager is configured for sending the at least one of the existing copy or a new copy of the e-mail message to the new delivery location prior to receiving an e-mail update request for the e-mail message from the at least one user.

46. The network node of claim 43, wherein the storage manager is configured for selecting the storage locations based on the storage locations being within a prescribed proximity to members of the identified user class.

47. The network node of claim 46, wherein storage manager is configured for selecting each storage location based on the storage location meeting a prescribed minimum performance requirement.

48. The network node of claim 43, wherein the storage manager is configured for selecting the new storage location based on a detected loss of performance in the storage location storing the existing copy of the data file.

49. The network node of claim 43, wherein the storage manager is configured for:
   identifying the another network node, based on the access activity attribute, that has a determined proximity that is closer to the identified user class than the network node; and
   transferring the unique locality control object to the another network node, for control of the copies of the data file by the another network node, based on the another network node having the determined proximity closer to the identified user class than the network node.

50. The network node of claim 49, wherein the network node further is configured for:
   sending a new request to the another network node for modification of one of the copies of the data file, based on the another network node having possession of the unique locality control object; and
   selectively modifying the one copy of the data file based on whether the another network node approves the new request.

51. The network node of claim 49, wherein:
   the network node is configured for determining that the unique locality control object for the data file is no longer available on the network based on a determined absence for a prescribed interval; and
   the storage manager is configured for generating within the network a new unique locality control object for the data file to replace the unique locality control object having been determined as no longer available.

* * * * *

UNITED STATES PATENT AND TRADEMARK OFFICE
CERTIFICATE OF CORRECTION

PATENT NO. : 7,634,566 B2
APPLICATION NO. : 10/859208
DATED : December 15, 2009
INVENTOR(S) : Turner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1373 days.

Signed and Sealed this

Twenty-first Day of December, 2010

David J. Kappos
*Director of the United States Patent and Trademark Office*